J. Singer,
Shovel Plow.

No. 111,391.   Patented Jan. 31, 1871.

Witnesses:
S. S. Mabee
Alex. F. Roberts

Inventor:
J. Singer
per Munn & Co.
Attorneys.

UNITED STATES PATENT OFFICE.

JOSEPH SINGER, OF MENDOTA, ILLINOIS.

IMPROVEMENT IN CULTIVATOR-PLOWS.

Specification forming part of Letters Patent No. 111,391, dated January 31, 1871; antedated January 14, 1871.

*To all whom it may concern:*

Be it known that I, JOSEPH SINGER, of Mendota, in the county of La Salle and State of Illinois, have invented a new and Improved Cultivator-Plow; and I do hereby declare that the following is a full, clear, and exact description thereof, which will enable others skilled in the art to make and use the same, reference being had to the accompanying drawing, forming part of this specification.

Figure 1:
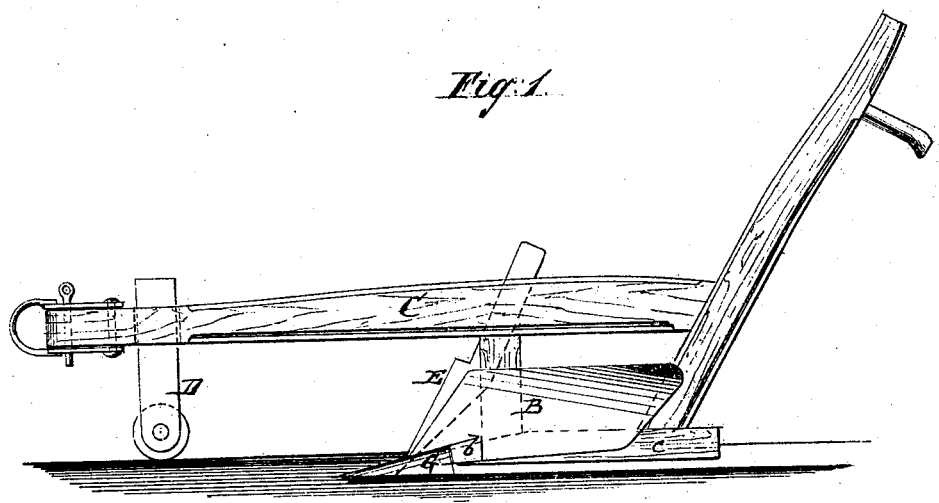
Figure 2:
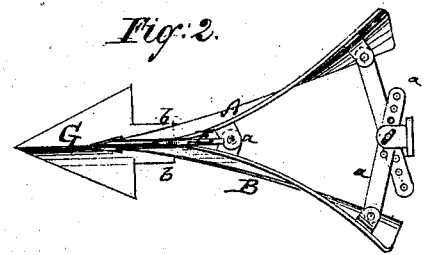

Figure 1 represents a side elevation of my improved plow. Fig. 2 is a plan or top view of the same.

Similar letters of reference indicate corresponding parts.

The invention relates to plows; and consists in improvement therein in respect to the arrangement of hinged adjustable mold-boards, a colter, and a shovel-point, as hereinafter set forth.

A B in the drawing are the two mold-boards of a cultivator-plow. The same are connected with each other by jointed rods $a\ a$, as shown in Fig. 2, so that they may be adjusted any suitable distance apart for cultivating between rows of suitable width. The plow is secured to a suitable beam, C, which may, in front, be supported by a vertically-adjustable wheel, D. Between the front edges of the plowshares A B is interposed a knife, E, which has an upward-projecting shank, that may be fitted through the plow-beam, as indicated in Fig. 1. The front cutting-edge of knife serves to cut the sod and to relieve the plowshares from the service of cutting. When the shares are made of wood they will become serviceable by the application of the knife E. Where the shares are made adjustable, and the front edges apt to become separated, the application of the knife E is also extremely important. In this case the knife may be wedge-shaped in cross-section to fit crevices of greater or less width.

The invention consists also in the application of a shovel attachment to the double mold-board, the shovel G being made in form of an arrow, as shown. It is fastened under the lower side of the plowshares, and has ears $b\ b$, which lap over the front part of a brace, $c$, that projects forward from the plow-standard.

The shovel is perforated to receive the lower end of the knife E. The shovel will, in this case, constitute the point of the plow, and, together with the knife, it will remove the main strain and wear from the mold-boards.

Having thus described my invention, I claim as new and desire to secure by Letters Patent—

The arrangement of the arrow-shaped shovel G, knife E, and hinged mold-boards A and B, connected adjustably by the perforated arms $a\ a$, with the brace $c$ and vertical standard, and all constructed as shown and described.

JOSEPH SINGER.

Witnesses:
    C. JOHNS,
    GEO. KLUSKER.